US010640212B1

(12) United States Patent
Dizdarevic et al.

(10) Patent No.: US 10,640,212 B1
(45) Date of Patent: May 5, 2020

(54) DOUBLE WING AIRCRAFT (71) Applicants: Faruk Dizdarevic, Anaheim, CA (US); Mithad Dizdarevic, Anaheim, CA (US)

(72) Inventors: Faruk Dizdarevic, Anaheim, CA (US); Mithad Dizdarevic, Anaheim, CA (US)

( * ) Notice: Subject to any disclaimer, the term of this patent is extended or adjusted under 35 U.S.C. 154(b) by 0 days.

(21) Appl. No.: 16/194,366

(22) Filed: Nov. 18, 2018

(51) Int. Cl.
B64C 39/08 (2006.01)
B64C 3/10 (2006.01)
B64C 3/32 (2006.01)

(52) U.S. Cl.
CPC .............. B64C 39/08 (2013.01); B64C 3/10 (2013.01); B64C 3/32 (2013.01)

(58) Field of Classification Search
CPC .......... B64C 39/068; B64C 39/08; B64C 3/10
See application file for complete search history.

(56) References Cited

U.S. PATENT DOCUMENTS

| | | | |
|---|---|---|---|
| 2,147,968 A | 2/1939 | Delanne | |
| 2,151,128 A | 3/1939 | Looney | |
| D166,843 S * | 5/1952 | Bailey | B64C 39/08 D12/331 |
| 3,985,317 A | 10/1976 | Geraci | |
| 4,030,688 A | 6/1977 | Pellarini | |
| 4,090,681 A * | 5/1978 | Zimmer | B64C 39/068 244/45 R |
| 4,390,150 A * | 6/1983 | Whitener | B64C 39/08 244/13 |
| 4,907,764 A | 3/1990 | Long | |
| 6,070,831 A | 6/2000 | Vassiliev | |
| 8,056,852 B1 | 11/2011 | Dizdarevic et al. | |
| 8,123,160 B2 | 2/2012 | Shepshelovich | |
| 8,393,564 B2 | 3/2013 | Kroo | |
| 9,884,682 B2 | 2/2018 | Stuckl et al. | |
| 2009/0014587 A1* | 1/2009 | Bertani | B64C 3/10 244/120 |
| 2010/0163670 A1* | 7/2010 | Dizdarevic | B64C 1/0009 244/36 |
| 2011/0180660 A1* | 7/2011 | Llamas Sandin | B64C 39/068 244/1 N |
| 2012/0012692 A1* | 1/2012 | Kroo | B64C 3/56 244/6 |
| 2013/0020429 A1* | 1/2013 | Kroo | B64C 3/16 244/6 |

* cited by examiner

Primary Examiner — Timothy D Collins
Assistant Examiner — Terri L Filosi (57) ABSTRACT

The present invention is a double wing aircraft with two fixed wings embodied as either a flying wing configuration or a double wing configuration having a fuselage with smaller external dimensions, larger airlifting area, thinner airfoils, and lighter airframe relative to prior art that altogether is resulting with lower drag, fuel consumption, harmful emissions, and noise, as well as higher speed and flight safety, longer range, and shorter runway when compared to prior art.

3 Claims, 7 Drawing Sheets

DOUBLE WING AIRCRAFT

FIELD OF THE INVENTION

The present invention relates to aircraft with two fixed wings mutually arranged in flight direction.

BACKGROUND OF THE INVENTION

Most natural flyers and man-made flying objects are having only one pair of symmetric wings for lift production that are attached to a centrally positioned body. The exceptions to this configuration are related to very rare smaller natural flyers with two pairs of flapping wings and flying objects with multiple smaller rotary wings such as helicopters that have insufficient lift capacity, speed, and range for the current mass-transportation needs.

The following configurations of aircraft for mass transportation have been created so far:
- "Tube-and-wing" aircraft configuration with a pair of wings for lift production and roll control, fuselage for payload accommodation, and empennage for pitch and yaw control.
- "Tube-and-wing" configuration with only a vertical tail where wings except for lift production are used for flight control in pitch and roll directions while vertical tail for yaw control.
- "Canarded tube-and-wing" configuration where canards are substituting tailplane for pitch control.
- "Tailless flying wing" configuration where a single wing is used for lift production, payload accommodation, and flight control.
- "Tailed flying wing" configuration where tail surfaces are assisting a single wing in pitch and yaw flight control.
- "Canarded flying wing" configuration where canards are substituting the role of tailplane in pitch direction.
- Multiple wing configuration with more than one wing arranged in flight direction for simultaneous lift production and flight control.

The first idea of an aircraft having more than one fixed wing appeared more than 80 years ago in U.S. Pat. No. 2,147,968 of Feb. 21, 1939. This patent suggested a substitution of empennage used only for flight control with a fixed rear wing that in addition to flight control is capable to assist with lift production in order to increase the lift capacity of aircraft. This idea has been very attractive, thus initiating many subsequent patents since then with different solutions for multiple wing arrangements. However, over the past 80 years, nobody has been able to develop a realistic aircraft that is competitive with the current prevailing tube-and-swing configuration with a single wing and empennage for mass transportation as multiple wing idea requires more complex flight mechanics relative to the single wing arrangement with separate surfaces for lift production and pitch control.

The initial U.S. Pat. No. 2,147,968 whose idea is similar in some ways to double wing aircraft as outlined in this application did not offer any specifics relative to the wing geometry, size, and gravity center position relative to the wings, as well as any other aerodynamic feature of the wings that would address how to achieve lift production on both wings and simultaneously a sufficient level of flight control and safety of such aircraft.

The only specific in the initial patent was outlined in claim 1 as "a rear wing staggered relative to the forward wing by a distance at least equal to the width of the front wing" with no specifics as to in which direction "distance" is referred to whether being horizontal, vertical, diagonal, etc., which is important for flight mechanics. The confusion in this regard is further increased with a reference in specification "it is to be noted that the number and relative position of the front and rear wing may be varied", which relates to a modification shown in FIG. 8 that reflects an additional vertically coupled front wing with a rear wing.

From the standpoint of shape and size of front and rear wing, only one generic sentence was noted in specification where it says that "the maneuvering may be insured by means of hinged ailerons mounted on wings 1 and 2 of which the shapes and dimensions, as will be understood, are selected in such manner to ensure the desired lift and stability." The position of gravity center relative to front and rear wing that is essential for flight mechanics of a double wing configuration was completely omitted in claims, specification, and drawings.

The "double wing aircraft" idea of this patent application contrary to the above initial patent is revealing geometric configuration variables related to the mutual size and distance between front and rear wing, their aspect ratio that is affecting the wing shapes, and aerodynamic features of both wings as reflected with the position of their air pressure centers relative to the position of gravity center in flight direction that are forcing rear wing to generate a substantial positive lift and high stability of aircraft in stationary flight conditions by using the best simultaneous combinations of suggested variables. The suggested shape of wings as the consequence of low aspect ratio is resulting with longer chords and lower airfoil thickness, which along with low lift coefficient due to the large size of both wings is reducing aerodynamic drag.

The double wing aircraft idea relative to the initial U.S. Pat. No. 2,147,968 on the top of the above specific suggested variables is additionally offering many innovating ideas related to the specific architectural solutions for connecting front and rear wing, specific solutions for payload accommodation, as well as specific accommodation and connections of engines and landing gears to the airframe.

All patents related to aircraft that are having more than one wing based on the initial U.S. Pat. No. 2,147,968 until today may be sorted in two general groups:
- Pure double wing aircraft without any other planar airlifting surfaces
- Multiple wing configurations with more than two planar airlifting surfaces An efficient aircraft configuration with two or more wings should generate approximately the same lift coefficient in cruise on all wings from the standpoint of aerodynamic efficiency while guaranteeing sufficient flight controls from the standpoint of flight safety where the term "wing" refers to an airlifting surface that is providing a positive lift in stationary flight.

In order to provide for a stable stationary flight, multiple wing aircraft must have at least two wings, one in front of gravity center and other behind gravity center with both wings producing positive lift in order to provide for the static stability in stationary flight and sufficient flight control in all flight regimes. An aircraft with more than two planar surfaces from the standpoint of both aerodynamic and flight control efficiency is aerodynamically oversized.

If there is not enough lift in stationary flight, it is more rational to increase the size of the existing wings as opposed to adding another wing. If there is insufficient level of flight control, it is more rational to adjust the mutual size and distance of existing two wings relative to gravity center than add new flight control surfaces. For this reason, the patents with more than two airlifting surfaces will not be addressed further.

Aircraft configurations with only front and rear wing may be sorted in three groups formed by:

Transformation of stabilizing tailplane set behind gravity center into a rear wing and simultaneously shifting the same forward towards gravity center while increasing its size.

Transformation of destabilizing canard set in front of gravity center into a front wing by shifting the same in aft direction towards the gravity center and increasing its size.

Formation of a substantial tandem wing configuration with gravity center between and far away from both front and rear wing.

The initial U.S. Pat. No. 2,147,968 and double wing aircraft of this patent application fall in the first group with a larger main front wing. Other than shifting a smaller tailplane surface forward towards gravity center while increasing its size, it is necessary to additionally shift the front wing airlifting forces in front of gravity center in stationary flight by either shifting the gravity center in aft direction behind front wing lifting forces or shifting the front wing air pressure center forward away from the gravity center, or doing both simultaneously. During this transformation, the rear wing lifting forces are staying substantially behind gravity center with its trailing edge flight control surfaces far behind the gravity center in order to guarantee a sufficient level of pitch control.

The double wing aircraft that belong to the second group as in U.S. Pat. Nos. 4,030,688 and 8,123,16062 are formed from a low-stable canarded aircraft that have a large main rear wing whose airlifting forces are positioned close to gravity center. An added small canard that is positioned moderately in front of gravity center is assisting with static pitch stability in stationary flight while additionally providing for pitch control in all flight regimes. The canard size of such aircraft is usually much smaller than the tailplane size to prevent a higher aircraft natural destabilization with larger destabilizing canard surfaces that are positioned in front of gravity center.

The transformation of canarded aircraft into a double wing configuration with a front canarded wing starts with the shift of aircraft gravity center forward away from rear wing air pressure center towards the canard, while simultaneously shifting the canard in aft direction towards the shifted gravity center with the increase of canard size to provide for a static stability of aircraft with higher positive lift production by the forward positioned canarded wing. This solution with canarded front wing and the large main rear wing has greater limitations during transformation when compared to the first group with tailplane as the forward shift of gravity center and aft shift of canards are shifting trailing edge flight control surfaces of the canard very close to the gravity center, thus making the canard inefficient for commanded pitch control when the forward shift of gravity center is making the large rear wing more aerodynamically sluggish for commanded pitch control of the aircraft, whereby decreasing the commanded pitch control efficiency and making such aircraft unsuitable for commercial transportation.

The third solution with a substantial tandem wing arrangement as in U.S. Pat. No. 4,390,150 is characterized with a long distance between front and rear wing, while the gravity center being positioned far between both wings. In this arrangement, a large front wing set far in front of gravity center is acting as a highly destabilizing canard, hence such aircraft are naturally either low-stable or unstable, thus such arrangement is also not suitable for commercial transportation.

The U.S. Pat. No. 8,056,852 of Nov. 15, 2011 called "Longitudinal Flying Wing Aircraft" reflects a multiple wing configuration with a large front wing that is adjusted for payload accommodation and gravity center positioned therein. The front wing carries a rear vertical reinforcement to which a "V" tail is connected to as rear stabilizing surfaces. "V" tail stabilizing surfaces on their upper ends carry integral rear airlifting surface with engine aerodynamic cover integrated in between. "V" tail with its high sweepback angle is connected to the aft portion of the vertical reinforcement of front wing to increase its own stabilizing function and simultaneously shift rear stabilizing airlifting surface in aft direction to the highest extent possible, whereby altogether shifting the aircraft neutral point and gravity center with positive static margin behind front wing lifting forces in order to enable rear airlifting surfaces to generate positive lift in cruise. However, far aft position of rear airlifting surfaces behind gravity center is increasing its stabilizing role but decreasing their ability to generate higher positive lift in cruise.

BRIEF SUMMARY OF INVENTION

A preferred embodiment of the present invention is a double wing aircraft with two large fixed wings mutually arranged in flight direction as a front and rear wing with both having a low aspect ratio with aircraft gravity center being located within front wing and between front and rear wing air pressure centers in stationary flight regime. The double wing idea reflects two different versions including a double wing aircraft with fuselage and a double wing as a flying wing aircraft depending on the shape of connecting elements by which front and rear wing are joined. With the flying wing version, the payload can be accommodated in the large front wing only, or in both wings depending on the mutual size of front and rear wing. Aircraft engines are preferably joined the rear wing structure and may be integrated within or attached externally thereto. The double wing aircraft configuration is allowing for a variety of landing gears attachment methods including a version with hydrodynamic floats for taking off and landing on the water.

These and other aspects of the invention will be better understood from the following detailed description and drawings.

Longitudinal Double Wing aircraft provides for the following applications and advantages over the prior art:

a) An opportunity to design a double wing aircraft to generate a positive lift over more than 90% of its total wetted area in cruise flight configuration when having an optimal cruise lift coefficient across both wings, hence providing for a high lift capacity, aerodynamic efficiency, as well as unmatched range till the present day.

b) An opportunity to design large commercial double wing aircraft with significantly smaller outer dimensions including span, length, and height for easier and safe operations at smaller airports.

c) An opportunity to design large transport double wing aircraft requiring a much shorter take-off runway to enable them to operate on smaller airports.

d) An opportunity to design long-range double wing aircraft with higher economical cruising speed to reduce the flight time over long distances.

e) An opportunity to design commercial double wing aircraft that are generating much lower level of noise in aircraft cabin and around airports while reducing environmentally harmful emissions when compared to present-day aircraft.

Accordingly, besides the objects and advantages of the prior art as described above in our patent application, the following objects and advantages of "Double Wing Aircraft" invention are:

a) Increasing the space for payload accommodation inside highly efficient airlifting surface of Front Wing to the highest degree possible without increase of overall outer aircraft dimensions while reducing the total wetted area per unit of payload.

b) The highest possible extension of airfoil chords of both wings from tips to symmetry plane in order to increase the total airlifting area and structural resistance, hence reducing structural weight while elongated chords resulting with thinner airfoils and therefore altogether resulting with major reduction in induced, compression, and wave drag at higher cruising speed with a goal to reduce fuel consumption and increase economical cruising speed and range.

Still further objects and advantages will become apparent from consideration of ensuing description and drawings. Although description contains many specifics, they should not be construed as limiting the scope of invention but merely providing illustrations for some of the presently preferred embodiments of invention. Therefore, the scope of the invention should be determined by the appended claims and their legal equivalents rather than by given examples.

REFERENCE NUMERALS IN DRAWINGS

100 Double Wing Aircraft
110 Line of Symmetry
120 Aircraft Gravity Center
130 Lateral Connecting Elements
140 Fuselage Connecting Element
150 Externally Attached Engines
160 Internally Integrated Engines
162 Engine Fan
164 Engine Air Intake
170 Rear Landing Gears
172 Front Landing Gears
175 Hydrodynamic Floats
180 Payload Cabin
190 Fin With Rudder
195 Winglet Fin With Rudder
200 Front Wing
210 Front Wing Leading Edge
220 Front Wing Trailing Edge
222 Front Wing Trailing Edge Lateral Segments
224 Front Wing Trailing Edge Central Segment
226 Front Wing Trailing Edge Farthest Aft Point
230 Front Wing Mean Aerodynamic Chord
235 Front Wing Mean Aerodynamic Chord Leading Edge
236 Front Wing Mean Aerodynamic Chord Trailing Edge
240 Front Wing Trailing Section
242 Front Wing Trailing Section Lateral Elements
252 Front Wing Trailing Section Lateral Ends
260 Front Wing Air Pressure Center
300 Rear Wing
310 Rear Wing Leading Edge
312 Rear Wing Leading Edge Farthest Forward Point
314 Rear Wing Leading Edge Lateral Segments
316 Rear Wing Leading Edge Central Segment
320 Rear Wing Trailing Edge
322 Rear Wing Trailing Edge Farthest Aft Point
330 Rear Wing Mean Aerodynamic Chord
335 Rear Wing Mean Aerodynamic Chord Leading Edge
336 Rear Wing Mean Aerodynamic Chord Trailing Edge
340 Rear Wing Central Section
342 Rear Wing Central Section Leading Portion
344 Rear Wing Central Section Trailing Portion
350 Rear Wing Lateral Sections
352 Rear Wing Lateral Sections Free Inner Ends
354 Longest Rear Wing Chord
360 Rear Wing Air Pressure Center

DETAILED DESCRIPTION

The present invention is a double wing aircraft for mass commercial air transportation with front and rear wing being mutually arranged in flight direction and embodied as a fuselage or flying wing version with bulky payload including passengers and cargo being accommodated inside the fuselage or wing respectively while a propulsion system is primarily joined the rear wing by being either attached on the top thereof or integrated within. The double wing aircraft can be also designed for take-off and landing over the ground or water as a hydroplane.

In accordance with the present invention, apparatus and methods of carrying bulky payload in an efficient double wing aircraft are presented.

In the following description, for purposes of explanation and not limitation, specific details are set forth in order to provide a more thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1A:
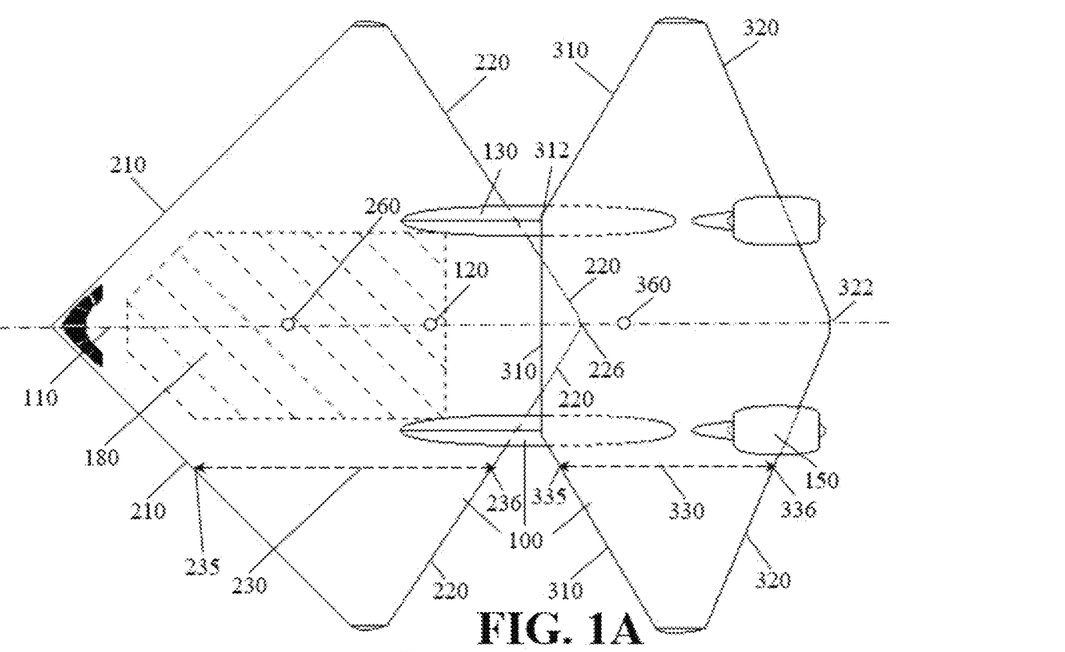
FIG. 1 shows the flying wing version of a double wing aircraft with simple shapes of front and rear wing including the position of their lifting forces relative to gravity center to better understand the basic prerequisites needed to design a double wing aircraft with a positive lift production on both wings in stationary flight. It further shows geometric and aerodynamic variables of front and rear wing that the level of positive lift of rear wing depends upon.
Figure 1B:
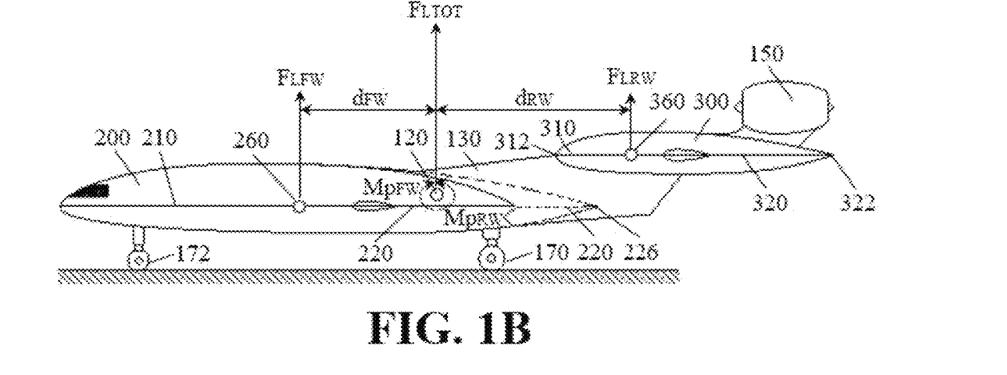

FIGS. 1A and 1B respectively illustrate a planform and side view of a flying wing version of double wing aircraft 100 with payload cabin 180 accommodated inside the contour of lifting surface of front wing 200 as shown with shaded area in FIG. 1A of double wing aircraft 100. Gravity center 120 is located within front wing 200 as shown in FIGS. 1A and 1B. Rear wing 300 and front wing 200 are mutually set in a tight arrangement in flight direction so that rear wing leading edge farthest forward point 312 is located behind gravity center 120 and slightly in front of front wing trailing edge farthest aft point 226. Front wing 200 and rear wing 300 are mutually connected by two symmetrical lateral connecting elements 130 that are aerodynamically shaped in flight direction.

The shape and size of front wing 200 is defined by the shape of front wing leading edge 210 and trailing edge 220, as well as their mutual distance in flight direction that is affecting front wing aspect ratio, which is recommended to be under 4. The aspect ratio of front wing 200 in FIG. 1A is approximately 2.1. Smaller aspect ratio for the same wing span is reflected with longer wing chords. The shape of front wing 200 is also defined by its taper, which is recommended to be under 0.2. Higher taper with the same aspect ratio is resulting with longer wing root chords and therefore higher structural resistance of wing.

The shape and size of rear wing 300 that has approximately the same wing span as front wing 200 is defined with leading edge 310 and trailing edge 320 with aspect ratio being approximately 3.2 as shown in FIG. 1A, which is below the recommended upper size limit of 5.5 while taper ratio being around 0.18. Low aspect ratio with high taper of both front wing 200 and rear wing 300 is a characteristic and important feature of double wing aircraft 100, especially for front wing 200. The size of rear wing 300 as shown in FIG. 1A is approximately 66% of the size of front wing 200, which is within the recommended range between 40% and 100% of the front wing size.

The resultant of front wing airlifting forces FLFW is positioned at the front wing air pressure center 260 that is located in front of gravity center 120 while the resultant of rear wing airlifting forces FLRW is positioned at the rear wing air pressure center 360 that is located behind gravity center 120 as shown in FIG. 1B, which is a prerequisite that both front wing 200 and rear wing 300 are producing positive lift in stationary flight so that front wing and rear wing pitch momentums MPFW and MPRW respectively around gravity center 120 have to be the same but with opposite orientation to counter each other and provide for the static pitch stability necessary for stationary flight of aircraft as shown in FIG. 1B.

Front wing air pressure center 260 is in front of 35% of front wing mean aerodynamic chord 230 from front wing mean aerodynamic chord leading edge 235. The same applies to rear wing air pressure center 360 that is in front of 35% of rear wing mean aerodynamic chord 330 from rear wing mean aerodynamic chord leading edge 335 as shown in FIG. 1A. The air pressure centers 260 and 360 are changed with the change of attack angles. The suggested position of air pressure centers in front of 35% of mean aerodynamic chords 230 and 330 is associated with low attack angles of both wings in stationary cruise flight when it is necessary to provide for static pitch stability as reflected in FIG. 1B. Further shift of air pressure center 260 forward at low cruise attack angle by adjusting the shape of airfoils of front wing 200 would increase the distance dFw of the resultant of front wing airlifting forces FLFW from gravity center 120 and consequently increase front wing pitch momentum, thus requiring the increase of rear wing lift FLRW to establish static pitch stability in stationary flight, whereas further shift of rear wing air pressure center 360 forward by adjusting the shape of airfoils of rear wing 300 would decrease the distance dRw of FLRW from gravity center, hence requiring additional increase of rear wing positive lift FLRW to be able to counter front wing pitch momentum MPFW and establish necessary static pitch stability of double wing aircraft 100.

The longitudinal positions of air pressure centers 260 and 360 depend on the geometry of local airfoils across the span of front wing 200 and rear wing 300 respectively. Efficient airfoils with aft camber that have a high lift coefficient and more shifted air pressure center in aft direction at low cruise attack angles are not favorable for front wing 200 of double wing aircraft 100 as the lift efficiency of rear wing 300 would be lower while a high lift coefficient of large front wing 200 would generate high induced, compression, and wave drag. For that reason, double wing aircraft are using more balanced airfoils with forward shifted air pressure centers at cruise attack angles with a lower cruise lift coefficient to reduce major induced, compression, and wave drag of front wing 200 while the total cruise lift of aircraft would be restored by a higher lift production of large rear wing 300 by using similar airfoils as on front wing 200.

The extremely elongated chords, especially of front wing 200 of flying wing version as shown in FIGS. 1A and 1B are providing for positive side effects such as substantial reduction of airfoil relative thickness especially in the large area of bulky payload to reduce compression and wave drag, increase payload capacity of flying wing version with longer cabin 180 and decrease cruise lift coefficient, as well as increase structural resistance to reduce airframe weight compared to prior art.

A relatively wide range of recommended geometric and aerodynamic variables including aspect ratio, mutual size and distance between front wing 200 and rear wing 300, as well as the longitudinal position of their air pressure centers is due to their complimentary use during optimization with different preferential priorities related to preferred flight performance of double wing aircraft 100.

Figures 2A, 2B, 2C:
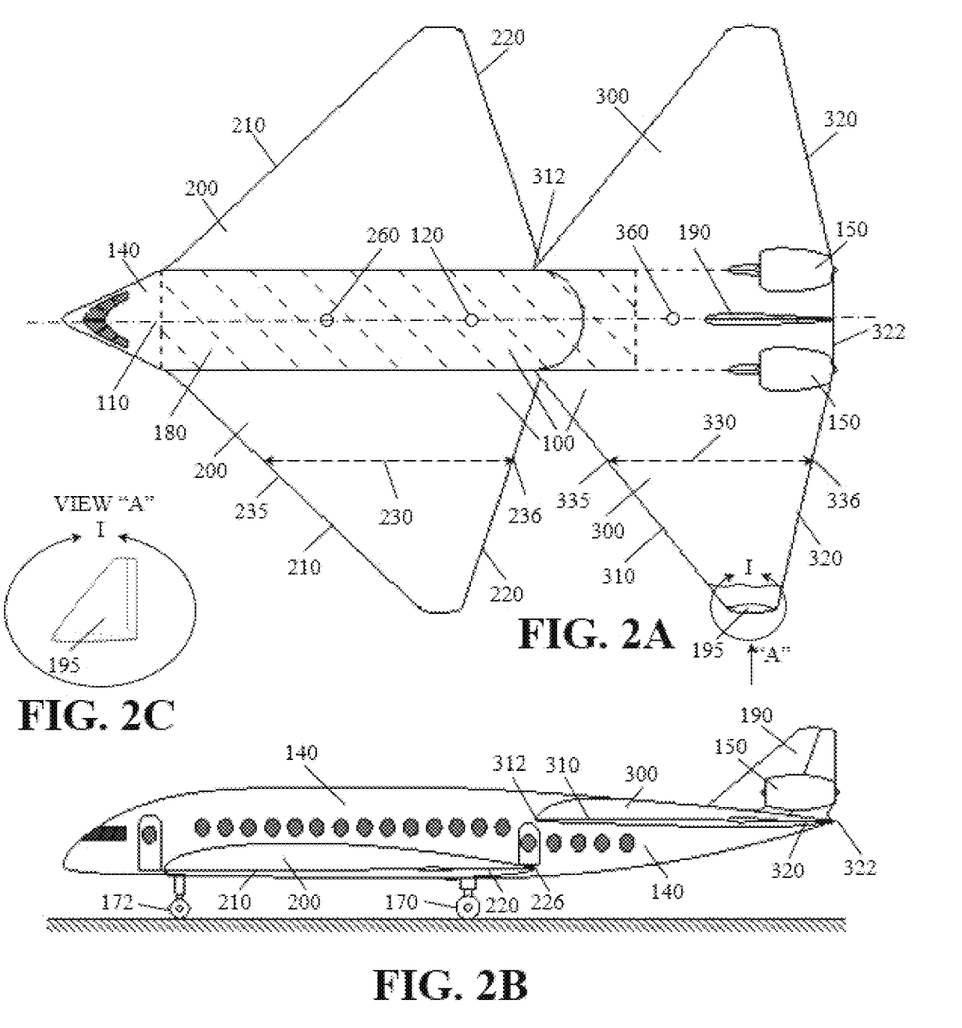
FIG. 2 shows the fuselage version of double wing aircraft with front and rear wing being mutually connected by a fuselage that has payload accommodated therein.

FIGS. 2A and 2B show respective top and side views of a double wing aircraft 100 where a fuselage for payload accommodation is used as connecting element 140 between front wing 200 and rear wing 300. It represents the fuselage version of double wing aircraft 100. The fuselage version of double wing aircraft 100 as shown in FIG. 2 is using the same geometric and aerodynamic variables for optimization of front wing 200 and rear wing 300 as the aircraft shown in FIG. 1 with similar recommended values in order to provide for a similar positive lift production of rear wing 300 and required flight safety in stationary flight of aircraft as shown in FIG. 2.

When comparing the double wing aircraft 100 with fuselage as shown in FIG. 2 with prior art aircraft that have wing and tailplane connected to the fuselage to which it has superficially visual likeness, it is apparent upon closer look that there are differences in the aspect ratio of both wings, the ratio between the size of front wing 200 and rear wing 300 planar surfaces, their different mutual position in flight direction, as well as different positions of air pressure centers 260 and 360 relative to gravity center 120 in stationary flight, which is similar to the flying wing version of double wing aircraft 100 in FIG. 1 in order to enable both wings to generate positive lift in stationary flight.

Front wing 200 with much longer chords compared to prior art is integrated with the bottom of the fuselage 140, thus covering a wide area of the fuselage's bottom surface, whereby forming a wide and long integral lower surface of front wing 200 and fuselage 140 close to the ground, thus generating a substantial ground effect and therefore resulting with much shorter take-off runway when compared to prior art. Rear wing 300 is connected to the top of rear portion of fuselage 140 to avoid turbulent airflow behind front wing 200. High lateral aerodynamic reflection of the large fuselage and absence of lateral connecting elements 130 in FIG. 1 are requiring additional vertical fin with rudder 190 along symmetry line 110, similarly as with prior art. An alternative architectural solution for yaw control of fuselage version is to have two smaller vertical winglets that act as fins with rudder 195 as shown in view "A" of detail "1" in FIG. 2A. Aircraft engines 150 are connected externally to rear wing 300 over its airlifting surface.

The double wing aircraft with fuselage is generally less efficient than flying wing version of double wing aircraft 100 due to smaller airlifting area of both front wing 200 and rear wing 300 for the same span that are discontinued by a wide fuselage and due to an added large parasitic area of fuselage 140, as well as fin and rudder 190. However, it is more suitable for accommodation of bulky payload for smaller size aircraft of up to 150 passengers since flying wing version of double wing aircraft 100 of that size would require much higher relative thickness of front wing airfoils in order to provide for a sufficient height of payload cabin, which would substantially increase compression and wave drag at higher speeds of the flying wing version when compared to double wing aircraft with fuselage.

Figure 3A:
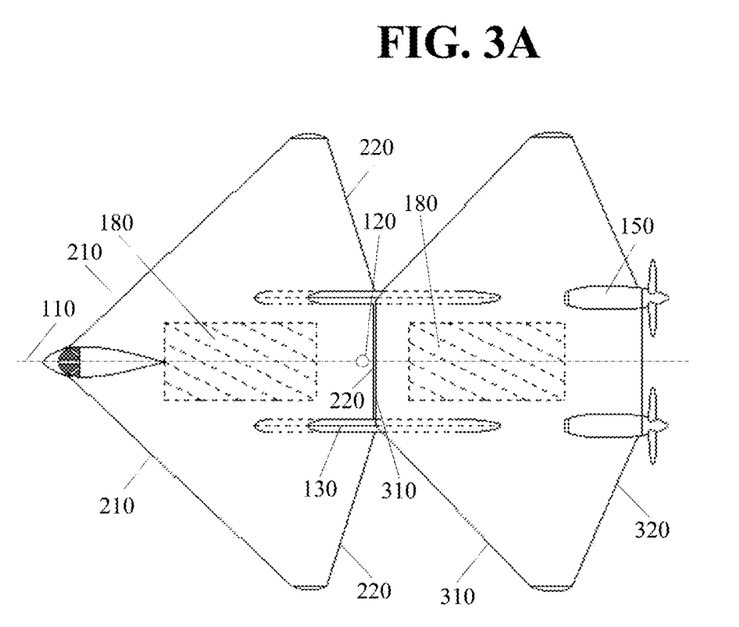
FIG. 3 shows a flying wing version of double wing aircraft with approximately the same size of front and rear wing to enable the accommodation of payload in both wings, which requires a specific attachment of rear wing landing gears to connecting elements instead of large wings.
Figure 3B:
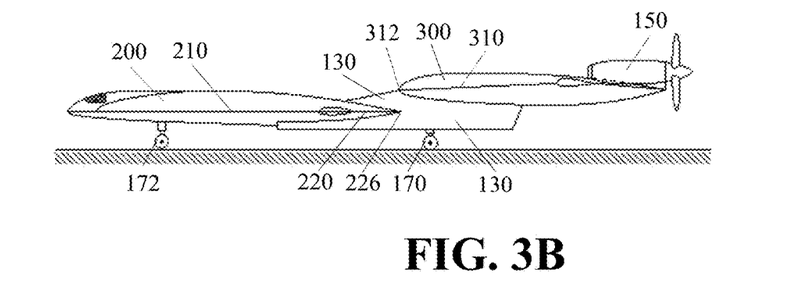
Figure 3C:
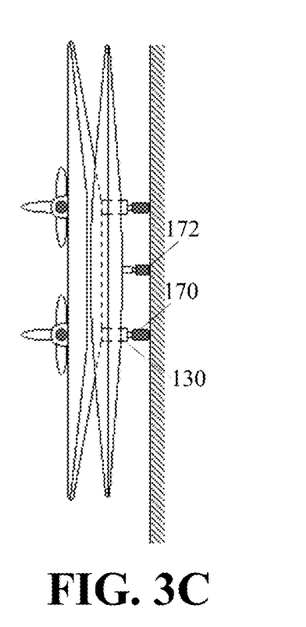

FIGS. 3A, 3B, and 3C show respective top, side, and front views of the flying wing version of double wing aircraft 100 with the size of rear wing 300 being close to the suggested 100% size of front wing 200 with a tight arrangement in flight direction between front wing 200 and rear wing 300 that are mutually joined with two lateral connecting elements 130 and aircraft engines 150 attached to rear wing 300. Approximately the same size and aspect ratio of both wings are resulting with approximately the same space inside the aerodynamic contour of both wings for the accommodation of payload cabin 180 in order to increase the payload capacity of the flying wing version of double wing aircraft with substantially increased lift capacity provided by the increase of the size of rear wing 300. Such aircraft would be favorable for less bulky or liquid payload, thereby being suitable for bulk cargo, air refueling, and firefighting aircraft. Such aircraft would have a turboprop power plant when used as firefighter or tanker aircraft for aerial refueling, which fly at lower speeds. Bulk cargo aircraft that fly at longer distances would preferably have turbo jet engines.

Large and heavy rear wing 300 with engines 150 and payload cabin 180 accommodated inside rear wing 300 are shifting the gravity center 120 very close to the front wing trailing edge 220, thus rear landing gears 170 that must be located behind gravity center would be impossible to attach to front wing 200 for aircraft shown in FIG. 1. A long distance of rear wing 300 above the ground would require irrationally very long rear landing gears. For that reason, the lower structure of two lateral connecting elements 130 that is positioned close above the ground is designed to enable the attachment of short rear landing gears 170 with a possibility of their retraction inside the contour of connecting elements during flight while front wing landing gear 172 is attached to front wing 200 as shown in FIG. 3B similarly to the aircraft shown in FIG. 1.

Figure 4A:
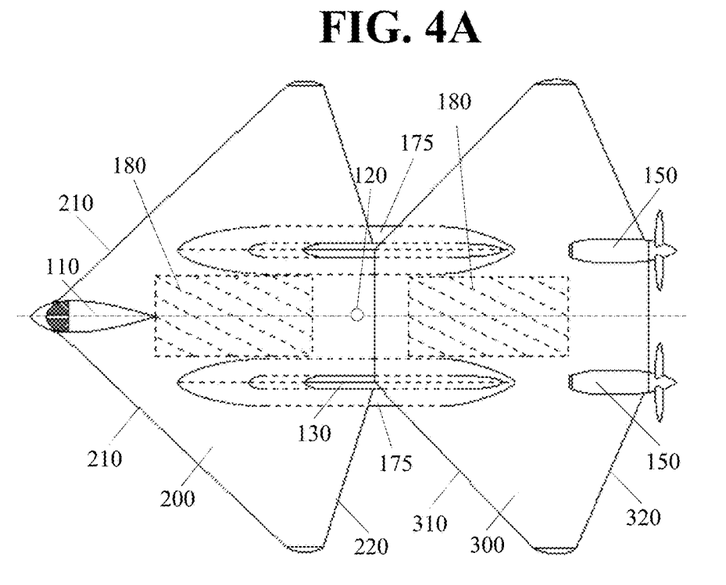
FIG. 4 shows a double wing aircraft that is using a water surface for takeoff and landing where landing gears are substituted by hydrodynamic floats attached to connecting elements between front and rear wing.
Figure 4B:
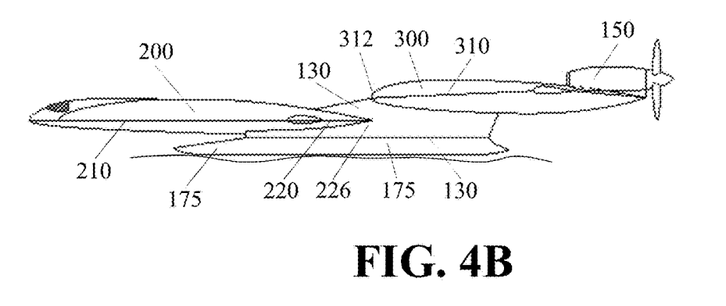
Figure 4C:
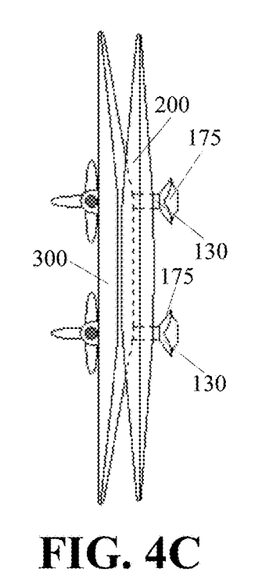

FIG. 4 shows architectural solutions similar to the double wing aircraft 100 as depicted in FIG. 3. The differences relate to the substitution of landing gears 170 and 172 as shown in FIG. 3 with two hydrodynamically shaped floats 175 that are integrated with the lower structure of two lateral connecting elements 130 to enable take-off and landing over the water surface as a hydroplane as shown in FIG. 4B. Such aircraft would be used for transportation of low bulky or liquid payload to smaller islands without robust airport infrastructure.

Figures 5A, 5C:
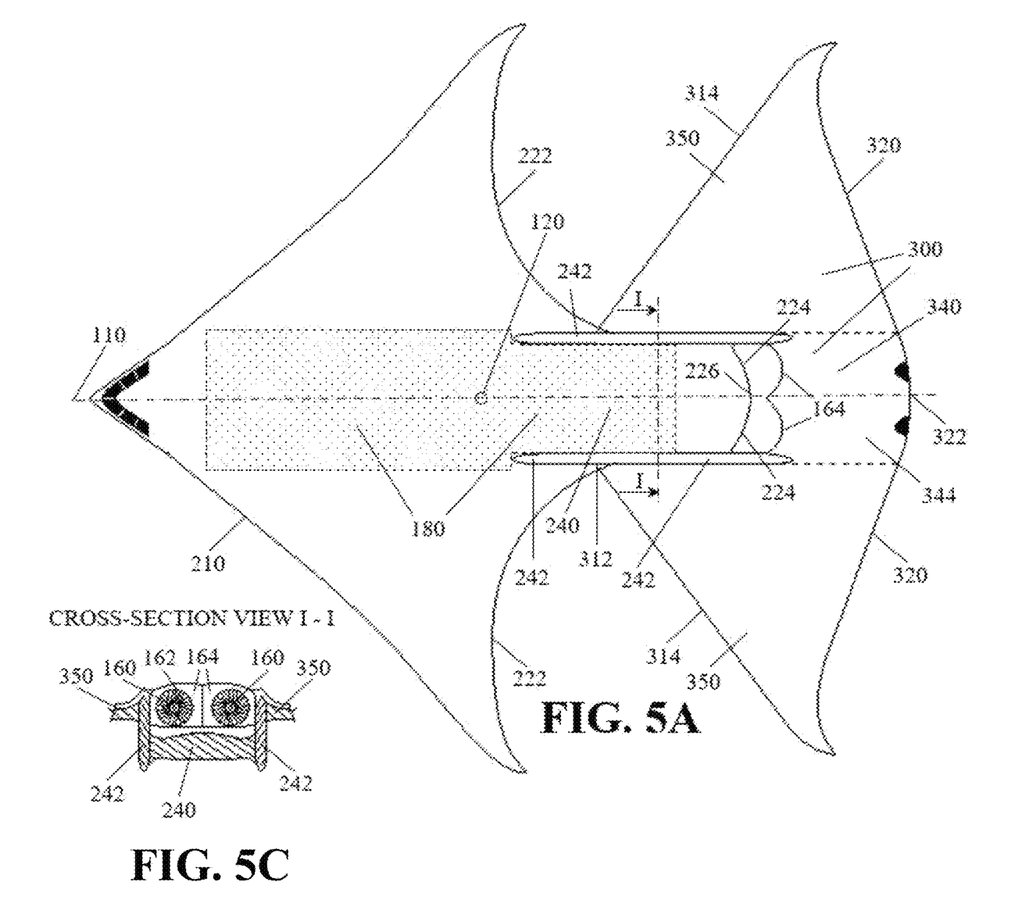
FIG. 5 shows a flying wing version of a double wing aircraft that has extended front wing trailing section around symmetry line between connecting elements in order to increase the payload capacity while the trailing portion of rear wing central section around symmetry line is accommodating aircraft engine inside its aerodynamic contour.
Figure 5B:
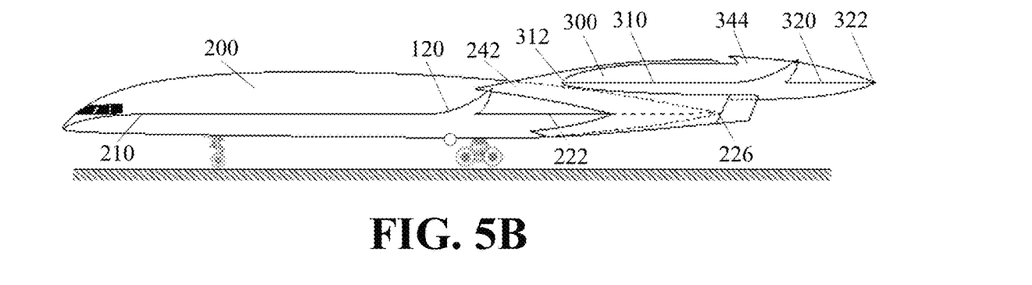
Figure 6:
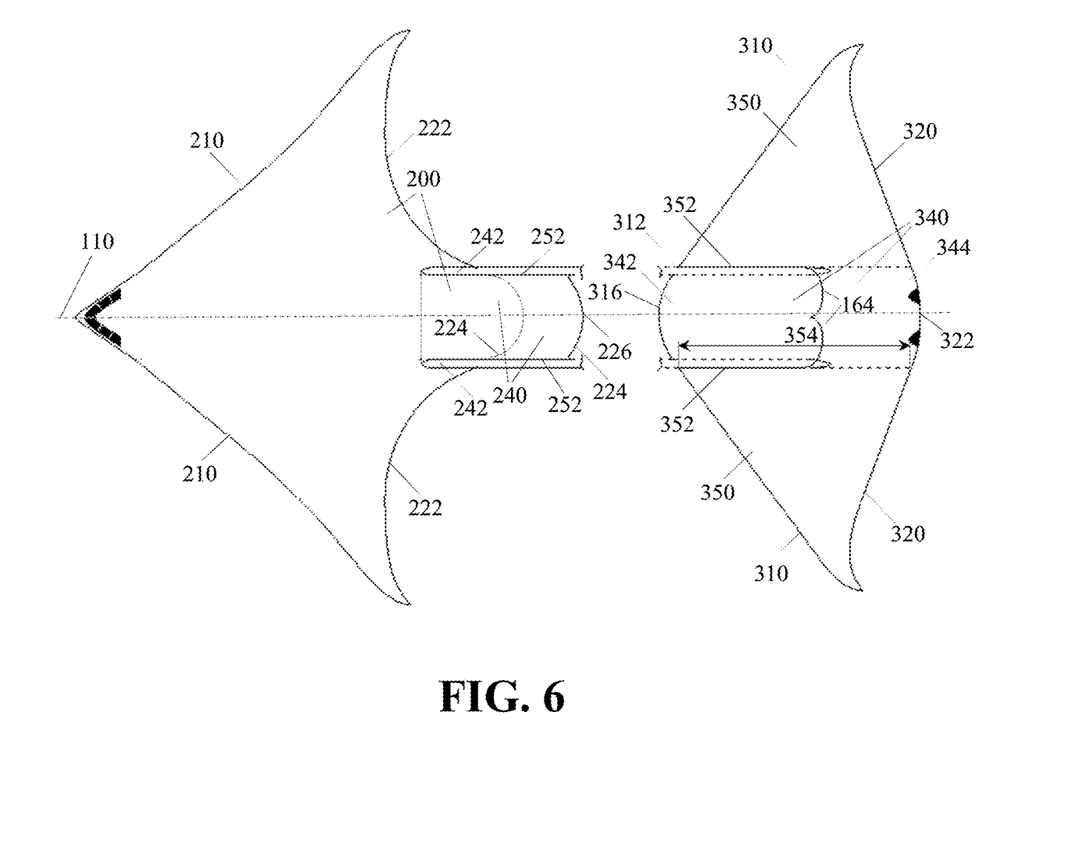
FIG. 6 shows the exploded planforms of front and rear wing of aircraft as shown in FIG. 5 to better outline the shapes of front wing with extended trailing section thereof and the cut-out leading portion of rear wing central section required for engine air intake creation.

FIGS. 5 and 6 show a flying wing version of double wing aircraft 100 with a specific innovative architecture of front wing 200 and rear wing 300, as well as aircraft engines 160 with fans 162 and air intakes 164 that are integrated with and accommodated inside trailing portion 344 of rear wing central section 340 as shown in FIGS. 5A and 5B, as well as cross section view I-I. FIGS. 5A and 5B show respective top and side views of double wing aircraft 100 while FIG. 6 shows the exploded view of front wing 200 and rear wing 300 to reflect more clearly the innovative aspects of both wings in the area of their mutual connection.

Front wing trailing section 240 about line of symmetry 110 is having two lateral elements 242 as shown in cross-section I-I of FIG. 5A. Two lateral elements 242 are extending over the airlifting surface of front wing 200 in order to connect front wing 200 and rear wing 300 as shown in cross-section I-I and FIG. 5B. The lateral elements 242 separate front wing trailing edge lateral segments 222 from front wing trailing edge central segment 224 of front wing 200, as well as leading edge lateral segments 314 from leading edge central segment 316 of rear wing 300 as shown in FIG. 6. The lateral elements 242 are extending in aft direction behind front wing trailing edge lateral segments 222 and central segment 224 as shown in FIGS. 5A and 5B. Front wing trailing section 240 is bound in aft direction with front wing trailing edge central segment 224 as shown in FIGS. 5A and 6. The front wing 200 inside its airlifting surface including trailing section 240 is accommodating payload cabin 180 about symmetry line 110 as shown in FIG. 5A.

Initially short trailing section 240 that is bound by the central segment 224 as shown with dash lines in FIG. 6 is extended further in aft direction far behind lateral segments 222 up to where central segment 224 is reaching a new position as shown with a solid line in FIG. 6 in order to increase the airlifting area of front wing 200, the length of airfoil chords between front wing leading edge 210 and central segment 224, as well as the length of payload cabin 180 of double wing aircraft 100 as shown in FIG. 5A.

The rear wing 300 inside the airlifting surface of trailing portion 344 of rear wing central section 340 is accommodating aircraft engines 160 about the line of symmetry 110 side-by-side between front wing lateral elements 242 as shown in cross section view I-I, as well as FIGS. 5A and 5B. The leading portion 342 of rear wing central section 340 in front of engine air intakes 164 between lateral elements 242 including rear wing leading edge central segment 316 are cut out as shown in FIG. 6 to create engine air intakes 164 that are exposed to free airflow as shown in FIGS. 5A, 5B, and cross section view I-I in FIG. 5A.

The integration of engines 160 inside the airlifting surface of trailing portion 344 is eliminating the parasitic drag of engine pylons while side-by-side mutual position of engines 160 with air intakes 164 that border each other is substantially increasing the entry area of air intakes 164 as shown in cross section I-I in FIG. 5A relative to circular air intakes of prior art.

The deep cut-out of leading portion 342 along with the rear wing leading edge central segment 316 as shown in FIG. 6 left a large space in front of engine air intakes 164 and between the rear wing lateral sections 350 as shown in FIG. 6, which enables a significant elongation of front wing trailing section 240 in aft direction behind lateral segments 222 up to where central segment 224 is reaching a position just in front of and below air intakes 164 as shown in FIGS. 5A, 5B, and cross section view I-I of FIG. 5A. Simultaneously, front wing lateral elements 242 are extending behind central segment 224 and raising up to cover and structurally connect rear wing lateral section free inner ends 352 as shown in FIG. 6, as well as FIGS. 5A, 5B, and cross section view I-I of FIG. 5A, thus resulting with insignificant aerodynamic interference between front wing 200 and rear wing 300 despite a long aft extension of front wing trailing section 240 between rear wing lateral sections 350.

The lateral ends of air intakes 164 as shown in FIG. 5A and cross section view I-I are aerodynamically blended with inner surfaces of lateral elements 242 in front of air intakes 164. Lateral elements 242 that are aerodynamically blended with the lateral sides of trailing section 240 as shown in cross-section view I-I of FIG. 5A behind lateral segments 222 as shown in FIGS. 5A and 5B are acting as upward oriented winglets that are preventing vertical vortices around the lateral ends 252 of trailing section 240 behind lateral segments 222 as shown in FIG. 6 while lateral elements 242 that are aerodynamically blended with rear wing lateral sections free inner ends 352 as shown in FIG. 6 are acting as downwardly oriented winglets that are preventing vertical vortices around rear wing lateral section free inner ends 352 in front of air intakes as shown in FIG. 6 and cross-section view I-I of FIG. 5A. Additionally, lateral elements 242 that are set laterally in front of air intakes 164 and front wing trailing section 240 that is set below air intakes 164 as shown in FIGS. 5A, 5B, as well as cross section view I-I of FIG. 5A are deflecting free airflow towards the air intakes 164, thus increasing engine efficiency at higher cruising speeds and simultaneously preventing the spread of air intake noise towards the ground at lower speeds during landing.

The aft extension of trailing section 240 is generating many positive side effects:
- Extension of payload cabin, whereby increasing the payload capacity of double wing of aircraft as shown in FIG. 5A without the increase of aircraft outer dimensions, thus allowing operations of larger aircraft at smaller airports.
- Increasing front wing airlifting area and chord lengths in the area of bulky payload. The increased lifting area is reducing cruise lift coefficient while increased chord lengths are reducing airfoil relative thickness in the large area of bulky payload, thus the reduced cruise lift coefficient with its square value reducing induced drag and together with reduced airfoil relative thickness exponentially reducing compression and wave drag of double wing aircraft 100 shown in FIG. 5.
- Shifting aircraft gravity center 120 in aft direction towards rear wing 300, thus requiring a higher positive lift production of rear wing 300 and additionally reducing cruise lift coefficient by increasing the area of rear wing 300.
- Aft shifted trailing section 240 to which lateral elements 242 are structurally connected deeply behind rear wing leading edge farthest forward point 312 below rear wing lateral sections free inner ends 352 of rear wing 300 to which lateral elements 242 are structurally connected as shown in FIGS. 5A, 5B, and cross section view I-I of FIG. 5A are shifting the structural connection between front wing 200 and rear wing 300 closer to the lifting forces of rear wing 300, thus reducing the momentums of rear wing lifting forces that are loading connecting structures of front wing trailing section 240 and lateral elements 242, as well as rear wing lateral sections 350 and consequently increasing the structural efficiency of front wing 200, rear wing 300, and lateral elements 242 as a connecting structure in the area of their mutual joint, hence subsequently reducing the airframe weight in that area of joint of large front and rear wings 200 and 300 respectively.

Figures 7A, 7B:
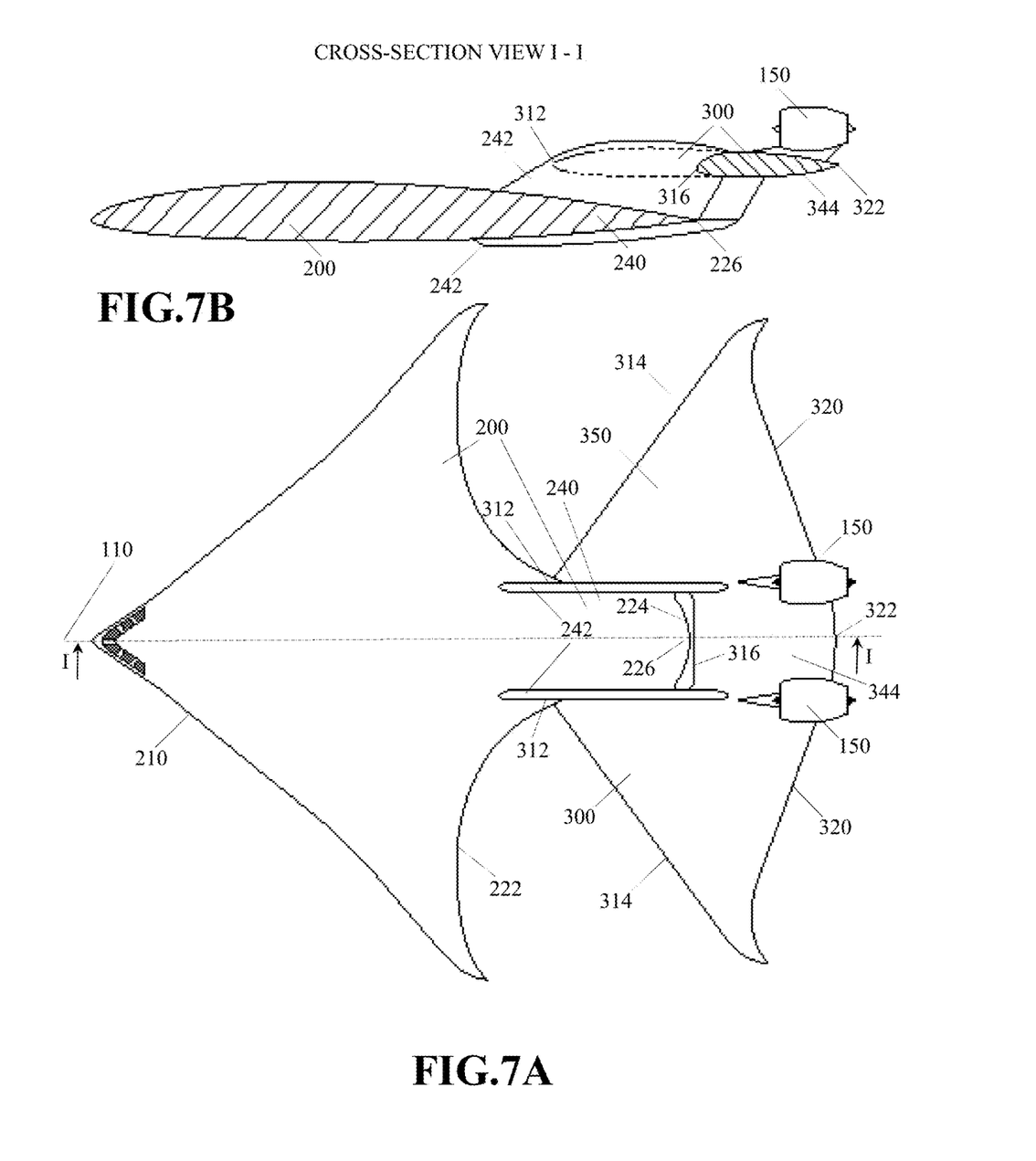
FIG. 7 illustrates a modified version of double wing aircraft from FIG. 5, wherein aircraft engines are attached externally over the rear wing while the trailing portion of rear wing central section is aerodynamically restored with the smooth leading edge instead of engine air intakes.

FIG. 7 shows the top and a longitudinal cross-section view I-I in symmetry line of the flying wing version of double wing aircraft 100 with the same architectural solution of front wing 200 where bulky payload is accommodated but with modified configuration of rear wing 300 relative to aircraft in FIGS. 5 and 6. The integrated engines 160 as shown in FIG. 5 are removed from trailing portion 344 to form a separate engine assembly 150 so that each engine has their own aerodynamic cover with air intake and pylon for external attachment thereof to the structure of rear wing 300 as shown in FIG. 7 and cross-section view I-I. The trailing portion 344 is aerodynamically recovered so that air intakes 164 of aircraft in FIG. 5A are substituted with smooth leading edge 316 of trailing portion 344 between lateral elements 242 and behind central segment 224 as shown in the top view of FIG. 7 in order to avoid aerodynamic interference between trailing section 240 of front wing 200 and trailing portion 344 of rear wing 300.

The solution with separate engine assemblies 150 relative to the solution with integrated engines 160 has positive and negative aspects.

The positive aspect is that it is allowing to select the optimal size, number, and position of engines while the restored leading edge 316 of trailing portion 344 substantially increasing the efficiency of trailing portion 344 for lift production, as well as natural and commanded pitch control and stability of aircraft.

The negative side effects of the solution with separate engines 150 are related to the increased parasitic wetted area and weight of engine aerodynamic covers and pylons, as well as lower aerodynamic efficiency of separate engine air intakes and consequently lower engine fuel efficiency at higher cruising speeds and altitude relative to air intakes 164 of engines 160 that are shown in FIG. 5A and associated cross-section view I-I.

We claim:
1. A double wing aircraft comprising:
a front wing defined by:
  i. an aspect ratio less than 4;
  ii. a taper with a taper ratio less than 0.2;
b. a rear wing with an area that is 40% to 100% of the front wing defined by:
  i. an aspect ratio less than 5.5;
  ii. a taper with a taper ratio less than 0.18;
c. at least one connecting element joining the front wing and the rear wing;

d. an aircraft gravity center;
e. a front wing mean aerodynamic chord with a leading and trailing edge having a front wing air pressure center located forward of 35% of the front wing mean aerodynamic chord in cruise and a rear wing mean aerodynamic chord with a leading and trailing edge having a rear wing air pressure center located forward of 35% of the rear wing mean aerodynamic chord in cruise wherein the rear wing mean aerodynamic chord leading edge is located aft of the front wing mean aerodynamic chord trailing edge, the aircraft gravity center is located forward of the rear wing lifting surface air pressure center and aft of the front wing lifting surface air pressure center in cruise;
f. the front wing being located lower than the rear wing in cruise.

2. The double wing aircraft of claim 1, wherein the connecting element is a fuselage for payload accommodation.

3. The double wing aircraft of claim 1, wherein two vertically oriented connecting elements join the front and the rear wing.

* * * * *